United States Patent [19]
Diefenbach

[11] Patent Number: 5,269,475
[45] Date of Patent: Dec. 14, 1993

[54] MILL FOR CONDIMENTS

[76] Inventor: Berndt Diefenbach, Liebigstrasse 6, 8000 München 22, Fed. Rep. of Germany

[21] Appl. No.: 951,592

[22] Filed: Sep. 25, 1992

[30] Foreign Application Priority Data

Sep. 30, 1991 [DE] Fed. Rep. of Germany ....... 9112184

[51] Int. Cl.⁵ .................. A47J 42/04; A47J 42/00; A47G 19/24
[52] U.S. Cl. .................................. 241/169.1; 241/95
[58] Field of Search ............... 241/95, 101.01, 168, 241/169.1, DIG. 17, DIG. 27; 222/142.1-142.4, 142.7

[56] References Cited

U.S. PATENT DOCUMENTS

| 1,264,134 | 4/1918 | Quick ......................... 241/169.1 X |
| 3,991,947 | 8/1975 | Schlessel ....................... 241/169.1 |
| 5,145,119 | 9/1992 | Lowe ........................... 241/169.1 X |

FOREIGN PATENT DOCUMENTS 2548812 10/1975 Fed. Rep. of Germany.
2557715 12/1975 Fed. Rep. of Germany.

Primary Examiner—Douglas D. Watts
Attorney, Agent, or Firm—Morgan & Finnegan

[57] ABSTRACT

A condiment or spice mill consists of a first condiment container (2) with a first grinding or milling means (3) and a second condiment container (4) with a second grinding or milling means (5) which are connected together by an intermediate member (6). In order to facilitate the handling of the condiment mill, the longitudinal axes (7,8) of the condiment containers (2,4) extend at an angle to each other and the end faces (13,14) of the condiment containers (2,4) lie in a common plane (15) (FIG. 1).

14 Claims, 5 Drawing Sheets

MILL FOR CONDIMENTS

BACKGROUND OF THE INVENTION

1. Field of the Invention

The invention relates to a condiment or spice mill with a first condiment container with a first grinding or milling means and a second condiment container with a second grinding or milling means which are connected together by an intermediate member.

2. Description of the Prior Art

Such kind of a condiment mill is for instance known from the German Utility Model 89 14 711. In the known condiment mill the longitudinal axes of the condiment containers extend laterally offset and are oppositely parallel to each other. Thereby the condiment containers form a crank handle which facilitates the operation thereof.

From German Utility Model 88 09 406 there is known a condiment mill consisting of a first condiment container with a first grinding or milling means and a second condiment container with a second grinding or milling means, wherein the condiment containers are also so connected together by an intermediate member that the longitudinal axes of the condiment containers are laterally offset and oppositely parallel to each other.

The condiment containers are of a design known per se and comprise a central rod carrying a grinding or milling means as well as an outer casing being rotatable in relation to the central rod, with a corresponding grinding tool. The mill is operated by turning the outer casing in relation to the central rod.

SUMMARY OF THE INVENTION

One object of the present invention is to provide a condiment or spice mill of the kind mentioned hereinbefore which is versatile in applications and easy to be handled.

In accordance with the invention this object is to be achieved by the fact that the longitudinal axes of the condiment containers extend at an angle to each other and that the end faces of the condiment containers lie in one plane. The intermediate member is of such a design that the longitudinal axes of the condiment containers extend at an angle to each other. In general, the arrangement is chosen such that the longitudinal axes of the condiment containers also intersect each other. The end faces of the condiment containers lie in one plane so that the condiment mill can be placed on a support, for instance a table. An elegant and esthetically pleasing appearance is obtained.

The condiment mill according to the invention can be operated in different manners. First of all, the condiment container which is to be operated is selected. Then said container is held to be in a vertical position. Subsequently, the selected condiment container or the selected condiment mill is operated. To this end, the entire condiment mill consisting of the two condiment containers can be held tight and the outer casing of the selected condiment mill may be turned. But it is also possible to hold fast the outer casing of the selected condiment container (of the selected condiment mill) with one hand and to turn the entire condiment mill by means of the other hand. Said rotation can be performed in that the condiment mill is grasped in the section of the intermediate member and turned. But it can also be carried out in that the other, not selected condiment container (the other condiment mill which is not selected) is grasped and turned around the longitudinal axis of the selected condiment container. Consequently, also the condiment mill according to the invention can be operated like a crank handle.

Advantageous further developments are defined in the dependent claims.

The longitudinal axes of the condiment containers may extend at right angles to each other. But it is also possible that the longitudinal axes of the condiment containers extend at an acute angle to each other.

The condiment containers may be of a cylindrical shape. The condiment containers are preferably of a circular cylindrical shape.

The intermediate member may consists of parts which are continuations of the condiment containers. But it can also be provided with a spherical center part.

According to a further advantageous development, a third condiment container is provided which is connected to the intermediate member on the side opposite the two other condiment containers. The third condiment container is preferably arranged in the extension of the bisecting line of the angle between the first two condiment containers. The third condiment container may be a condiment mill. But it can also be a condiment dispenser or strewer or castor.

The intermediate member may consist of two parts connected together in an articulated manner. The joint axis preferably extends through the intersection point of the longitudinal axes of the condiment containers. It is advantageous that the joint axis extends at right angles to the bisector of the angle between the longitudinal axes of the first and second condiment container. In this case, by turning the intermediate member the two condiment containers can be brought into a position in which they are aligned with each other.

The condiment container(s) can be provided with several, preferably three ribs at their outside. Thereby the turnability of the outer casing is enhanced. The ribs are preferably designed as continuous ribs. Furthermore, they are arranged at equal angular distances, i.e. three ribs are arranged at an angular distance of 120°. But the condiment container(s) may also be corrugated at their outside. The corrugation is at least disposed at a partial section. Furthermore, also other measures for increasing friction can be provided at the outside of the condiment container(s).

BRIEF DESCRIPTION OF THE DRAWING

Working embodiments in accordance with the invention will now be described with reference to the accompanying drawings, wherein.

DETAILED DESCRIPTION OF PREFERRED EMBODIMENTS

Figure 1:
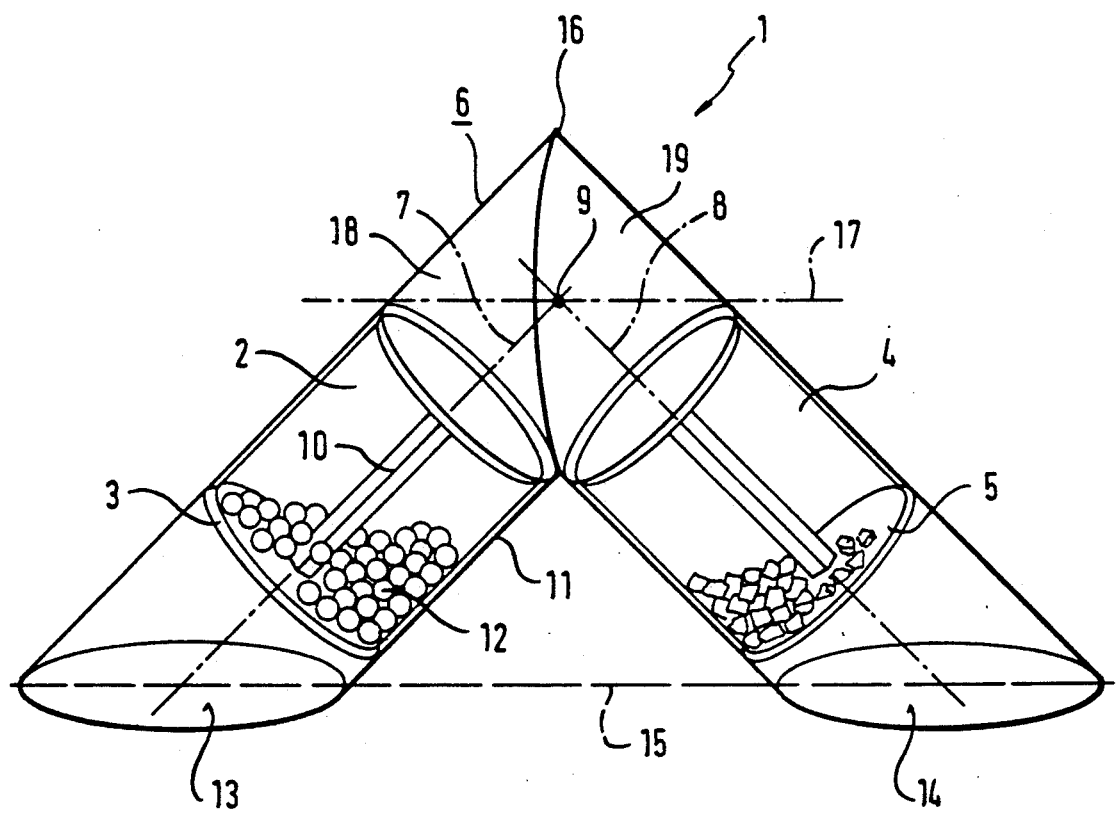
FIG. 1 shows a first embodiment of a condiment mill in a side elevation.

The condiment mill illustrated in FIG. 1, which as a whole is designated by the reference number 1, comprises a first condiment container 2 with a first grinding or milling means 3 and a second condiment container 4 with a second grinding or milling means 5 which are connected together by means of an intermediate member 6. The longitudinal axes 7, 8 of the condiment containers 2, 4 extend at right angles to each other. They intersect each other at point 9 in the center of the intermediate member 6.

The condiment container 2 is provided with a central rod 10 bearing a first grinding or milling means 3. Furthermore, the first condiment container 2 is provided with an outer casing 11 which is rotatably supported relative to the intermediate member 6 and which is provided with a corresponding grinding tool. The grinding tools of the central rod 10 and of the outer casing 11 form the grinding or milling means 3 by which the material to be ground can be ground when there is a relative rotation between the rod 10 and the outer casing 11.

The second condiment container 4 is of the same design as the first condiment container 2 so that a further detailed description thereof can be omitted. For the operation of the first condiment container 2, said container can be seized. The longitudinal axis 7 of the first condiment container 2 is placed in a vertical position and held above the food to be spiced. The operation can be carried in two different manners:

On the one side, the condiment mill 1 can be held fast, e.g. in the section of the intermediate member 6. With the other hand the outer casing 11 is turned.

On the other side, the outer casing 11 can be held tight by means of one hand. With the other hand the intermediate member 6 and together therewith the central rod 10 are turned. This can be carried out in that the intermediate member 6 is grasped and turned. But instead thereof or in addition thereto, also the other condiment container 4 can be seized and turned about the longitudinal axis 7 of the first condiment container 2 like a handle.

The end faces 13, 14 of the condiment containers 2, 4 lie in one and the same plane 15. Hence, the condiment mill 1 can be placed on a table in the position shown in FIG. 1.

As becomes obvious from FIG. 1, the condiment containers 2, 4 are of a cylindrical shape. The intermediate member 6 consists of parts being continuations of said condiment containers 2, 4. These parts form a point 16.

Figure 2:
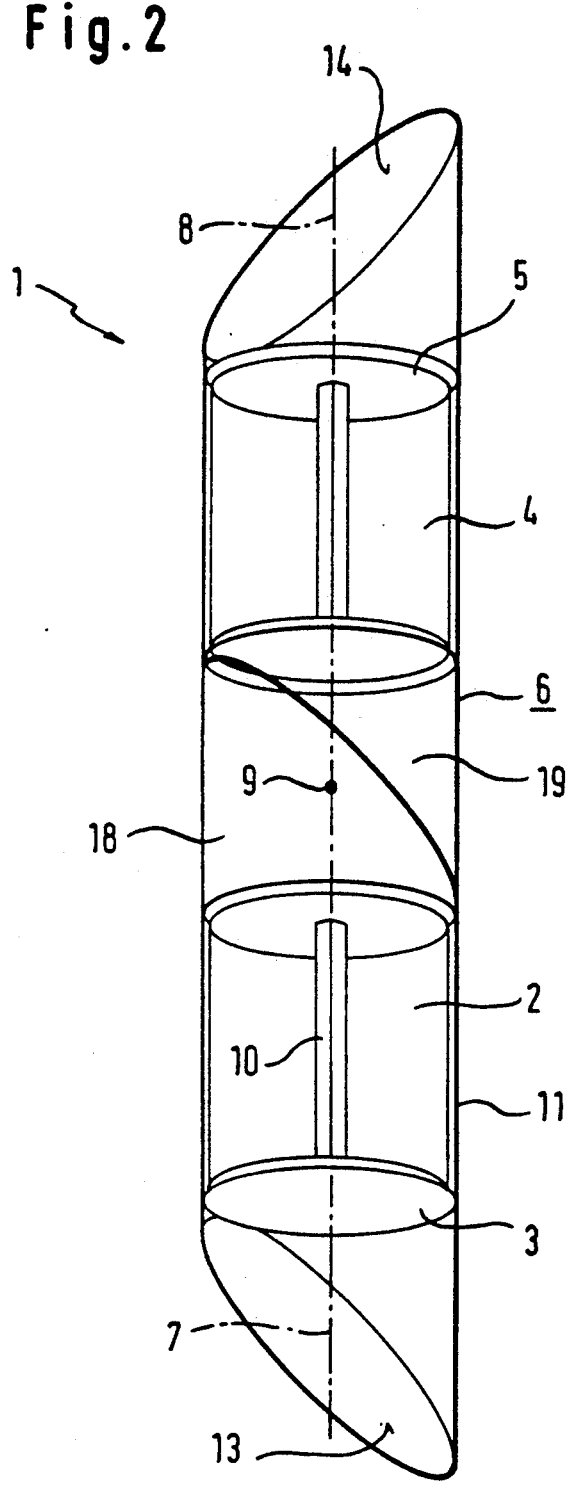
FIG. 2 shows the condiment mill of FIG. 1 after a rotation of the intermediate member, FIG. 3 a further embodiment of a condiment mill with a third condiment container, FIG. 4 a further embodiment of a condiment mill with an acute angle between the condiment containers, FIG. 5 a further embodiment with an intermediate member being provided with a spherical center part, FIG. 6 an enlarged view of the outer casing of a condiment container with a corrugation, FIG. 7 a sectional view along line VII-VII of FIG. 6, and FIG. 8 a sectional view through the condiment container with three continuous ribs at the outside in a representation corresponding to FIG. 7.

The intermediate member 6 consists of two parts 18, 19 connected together in an articulated manner. The joint axis 17 extends through the intersection point of the longitudinal axes 7, 8 of the condiment containers 2, 4. Furthermore, the joint axis 17 extends at right angles to the bisector of the angle between the longitudinal axes 7, 8 of the first and second condiment containers 2, 4. Thereby the condiment mill 1 may be brought into the position shown in FIG. 2 by being turned about the joint axis 17, in which the longitudinal axes 7, 8 are aligned with each other. In said position the condiment mill 1 may be placed on a support, e.g. a table. But it can also be stacked and transported in an especially space-saving manner.

Figure 3:
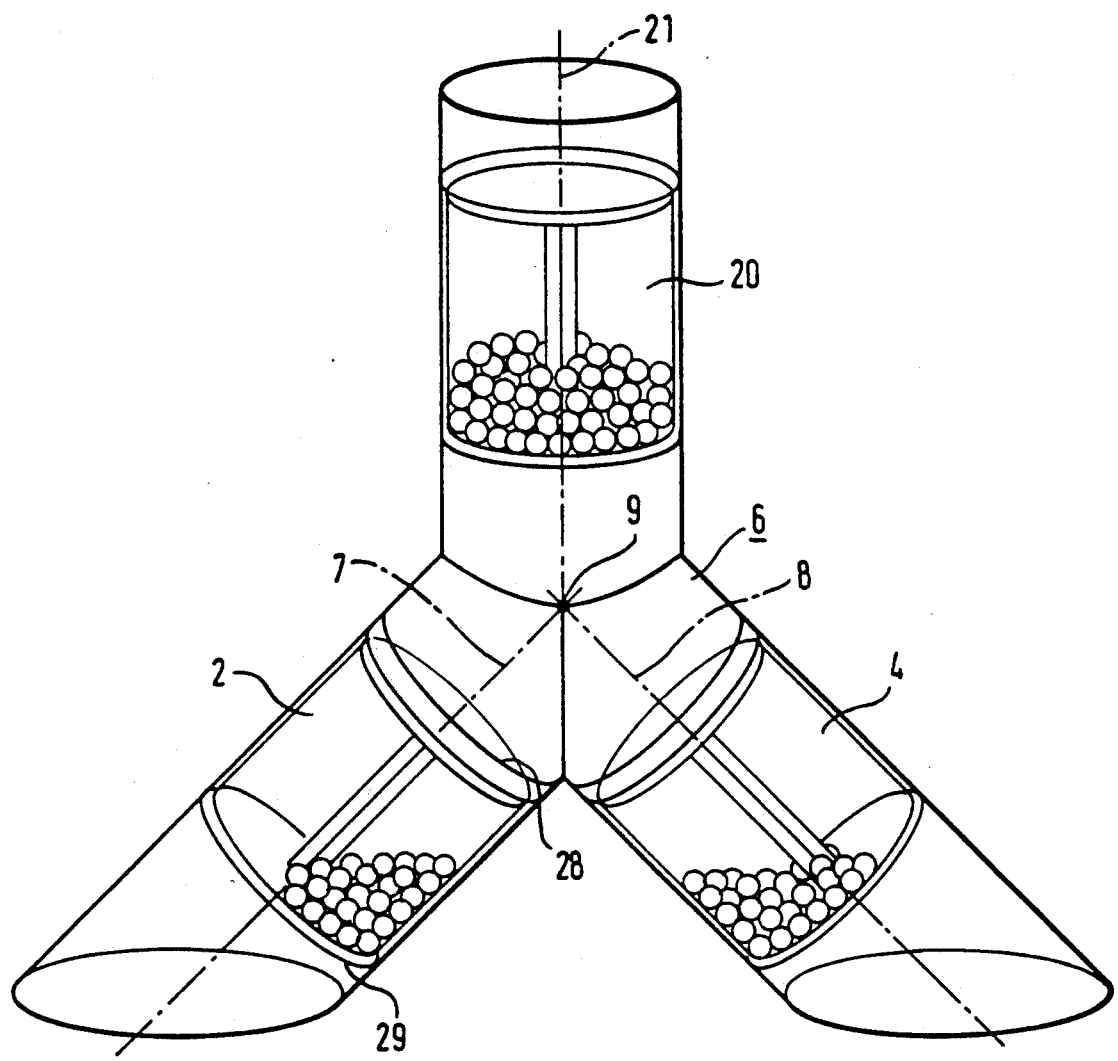

In the embodiment represented in FIG. 3 there is provided a third condiment container 20 which is also designed as a condiment mill, but which could also be designed as a condiment dispenser or strewer. The third condiment container 20 is connected with the intermediate member 6 at the side opposite the two other condiment containers 2, 4. The longitudinal axis 21 of the third condiment container 20 extends through the intersection point of the longitudinal axes 7, 8 of the first and second condiment containers 2, 4; it lies in the extension of the bisecting line of the angle between said two longitudinal axes 7 and 8.

Figure 4:
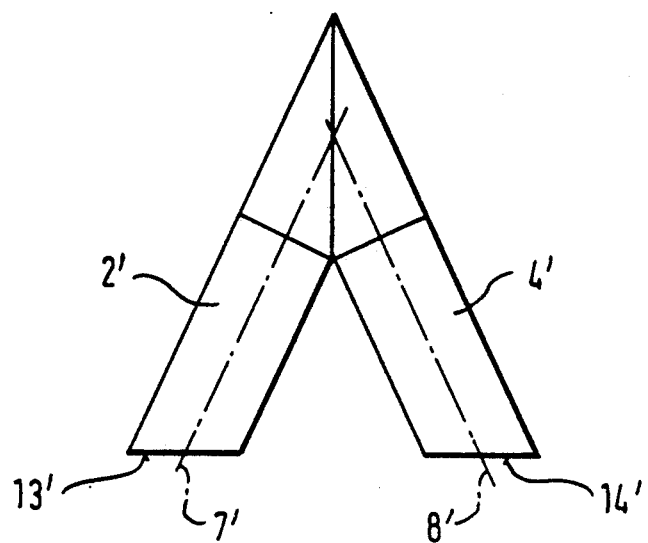

In the modification illustrated in FIG. 4, the longitudinal axes 7', 8' of the condiment containers 2', 4' extend at an acute angle to each other. Also therein the lower end faces 13', 14' of the condiment containers 2', 4' lie in one and the same plane.

Figure 5:
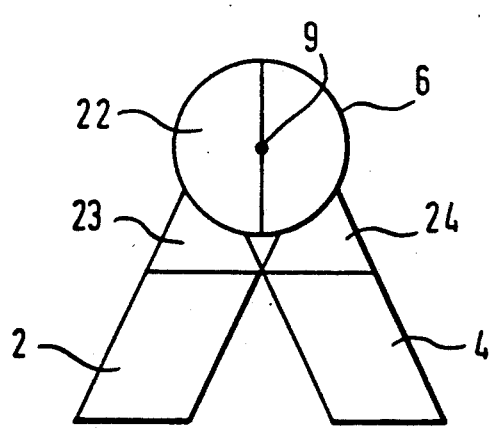

In the embodiment represented in FIG. 5 the intermediate member 6 is provided with a spherical center part 22. Said spherical center part is larger than the two projections 23, 24 to which the containers 2, 4 are attached. The spherical center part 22 can be used as a handle.

Figure 6:
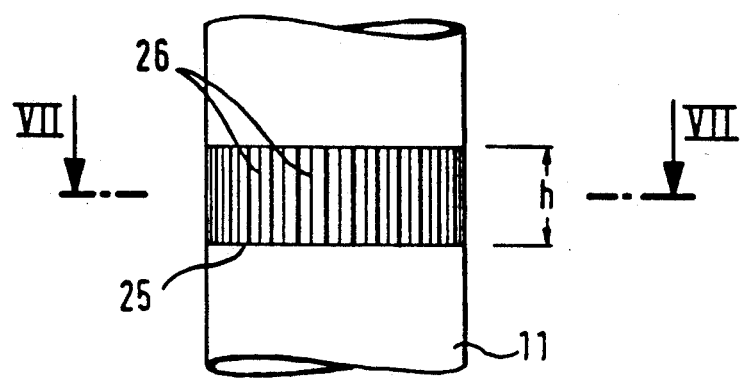
Figure 7:
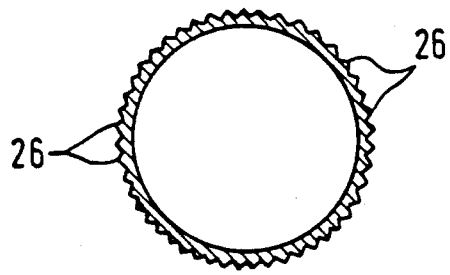
Figure 8:
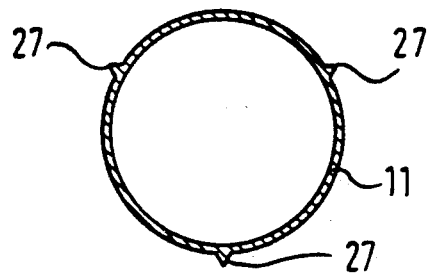

In FIG. 6 a section of the outer casing 11 of the first condiment container 2 is shown. In a partial section 25 with the height h a corrugation is provided which consists of a plurality of prominences 26. A cross-section through FIG. 6 along line VII—VII is illustrated in FIG. 7. Due to the corrugation 26 there is an increased friction when the outer casing 11 is grasped and turned so that it is possible to turn said outer casing 11 in an improved manner. In FIG. 7 there is also shown a section through the outer casing 11 of the first condiment container 2. Continuous, longitudinal ribs 27 are provided at equal angular distances of 120°, respectively, which also increase the friction during grasping and turning of the outer casing 11.

As shown in FIG. 3, for the filling of the condiment containers there is provided a releasable connection 28 between the intermediate member 6 and the condiment container 2, which can for instance consist of a screw connection. The releasable connections of the other containers 4, 20 are designed in a similar manner and are not individually shown in the drawing. For the filling, the condiment container 2 is unscrewed. Then it is filled and again screwed onto the intermediate member 6. Alternatively, a filling possibility may be provided at the lower end of the condiment container which is indicated by reference number 29.

We claim:
1. A condiment mill comprising
   a first condiment container having a longitudinal axis with a first grinding and milling means and a second condiment container also having a longitudinal axis with a second grinding and milling means in which the first and second condiment containers are connected together by means of an intermediate member,
   the condiment containers forming an angle with each other
   and that the condiment containers each having a respective end of the condiment containers face, both of the end faces lying in one plane.
2. A condiment mill according to claim 1, wherein the longitudinal axes of the condiment containers form a right angle with each other.

3. A condiment mill according to claim 1, wherein the longitudinal axes of the condiment containers form an acute angle with each other.

4. A condiment mill according to claim 1 wherein the condiment containers are of a cylindrical shape.

5. A condiment mill according to claim 1 wherein the intermediate member further comprises parts that are continuations of the condiment containers between the respective grinding and milling means and said end faces.

6. A condiment mill according to claim 5 wherein the intermediate member is provided with a spherical center part.

7. A condiment mill according to claim 1, further comprising any of the foregoing claims, wherein a third condiment container which is connected with the intermediate member at the side opposite the two other condiment containers.

8. A condiment mill according to claim 7, wherein the third condiment container is a condiment mill.

9. A condiment mill according to claim 7, wherein the third condiment container is a condiment dispenser and strewer.

10. A condiment mill according to claim 1 wherein the intermediate member has two parts connected together in a articulated manner and forming a joint axis therebetween.

11. A condiment mill according to claim 10, wherein the joint axis, runs through the intersection of the longitudinal axes of the condiment containers.

12. A condiment mill according to claim 10, wherein the joint axis forms a right angle with the bisecting line of the angle between the longitudinal axes of the first and second condiment container.

13. A condiment mill according to claim 1 wherein the condiment containers are each provided with at least three ribs on their respective outsides.

14. A condiment mill according to claim 1 wherein the condiment containers are each provided with a corrugation on their respective outsides.

* * * * *

UNITED STATES PATENT AND TRADEMARK OFFICE
CERTIFICATE OF CORRECTION

PATENT NO. : 5,269,475
DATED : December 14, 1993
INVENTOR(S) : Berndt Diefenbach It is certified that error appears in the above-indentified patent and that said Letters Patent is hereby corrected as shown below:

Column 4, Claim 1, line 64, delete "of the condiment containers."
Column 7, Claim 7, line 15, delete "any of the foregoing claims, wherein Signed and Sealed this Thirty-first Day of May, 1994

Attest:

BRUCE LEHMAN

Attesting Officer       Commissioner of Patents and Trademarks